Aug. 18, 1925.
D. NAGY
SEESAW
Filed Dec. 26, 1922
1,550,040
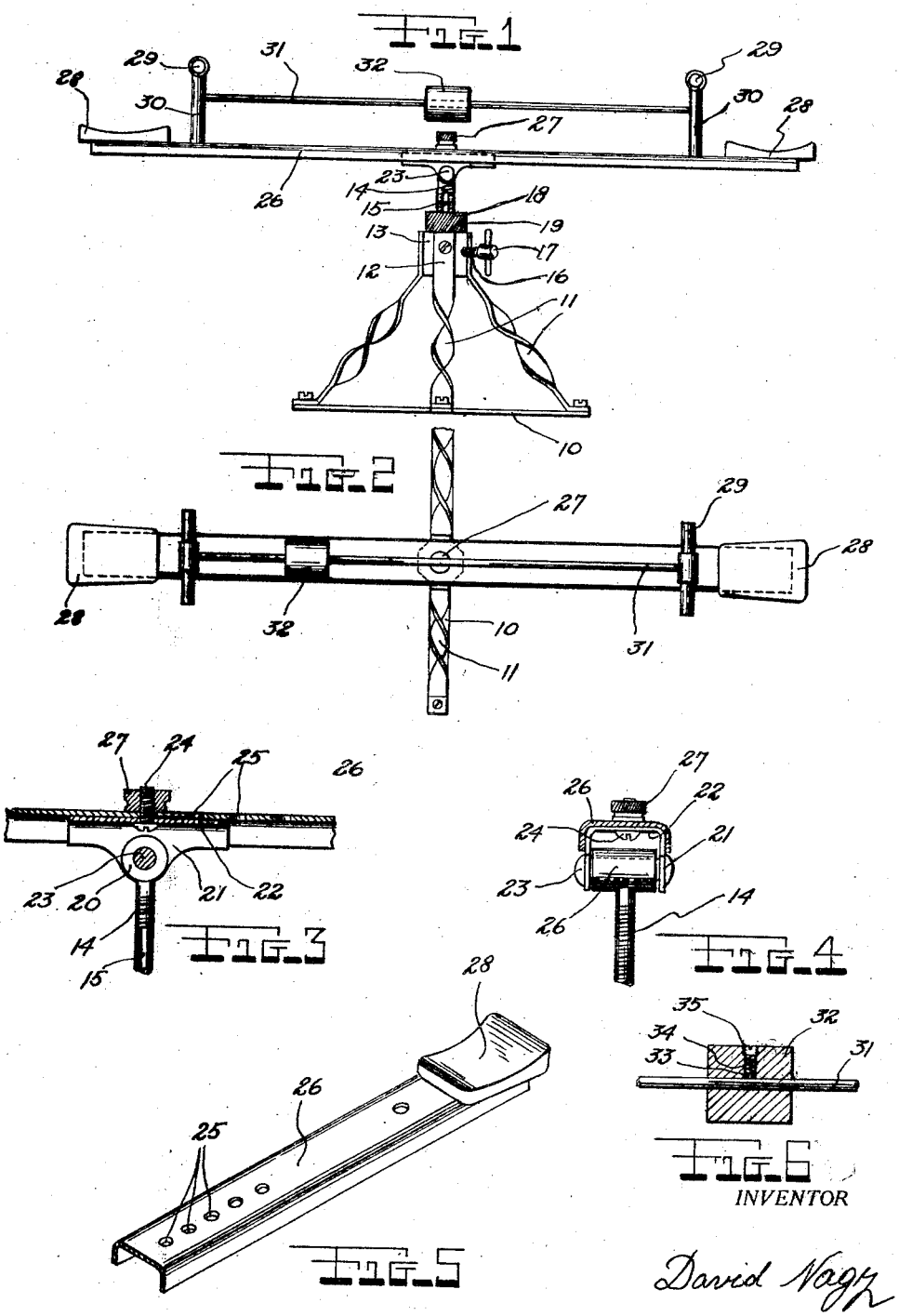
INVENTOR
David Nagy Patented Aug. 18, 1925.

1,550,040

UNITED STATES PATENT OFFICE.

DAVID NAGY, OF BROOKLYN, NEW YORK.

SEESAW.

Application filed December 26, 1922. Serial No. 608,948.

*To all whom it may concern:*

Be it known that I, DAVID NAGY, a citizen of Hungary, residing at Brooklyn, in the county of Kings and State of New York, have invented certain new and useful Improvements in Seesaws, of which the following is a specification.

This invention relates to improvements in see-saws or teeter boards as used by children for amusement and pleasure, preferably in the open air, during the warm season, but which may be used in play rooms, the action of the device being exhilerating and healthful.

One of the objects of the invention is to provide a see-saw apparatus that can be adjusted along its support so that persons of unequal weight can be accommodated and an equilibrium maintained.

Another purpose is in the provision of a sliding weight adjustable to counteract any minor inequalities in the weight of the users.

A further aim is to produce an apparatus that can be adjusted in height to suit the convenience and comfort of the parties using the apparatus.

These and other like aims, objects and purposes, tending to constitute an unusually complete and perfect apparatus, are accomplished by the novel construction, combination and arrangement of parts, hereinafter described and shown in the accompanying drawing, forming an essential portion of this disclosure, and in which:—

Figure 1 is a side elevational view of a see-saw made in accordance with the invention.

Figure 2 is a top plan view of the same.

Figure 3 is a fragmentary longitudinal sectional view showing the connections between the beam and support.

Figure 4 is a transverse sectional view of the same.

Figure 5 is a fragmentary perspective view of the beam and seat.

Figure 6 is an enlarged longitudinal sectional view of the balancing weight and its supporting rod.

The apparatus includes a standard comprised of a pair of strap-like plates designated by the numeral 10 crossed at right angles at their centers and having fixed on their ends the outturned lower members of angular supports 11, the upper converging ends 12 of which are secured rigidly to opposite sides of an octagonal block 13 having an axial opening.

Fitted to this opening is a screw 14 having a longitudinal slot 15 suited to receive the point of a set screw 16 provided with a head 17 adapted for manual operation, the arrangement being such that the screw can be securely clamped in adjustment relative to the block 13.

A knurled nut 18 is also fitted to the screw and can be clamped to it by set screw 16 which is interchangeable, in such manner as to secure the nut fixedly to the screw, thus permitting the screw to freely rotate in the block; when the set screw is retracted, the weight of the screw being taken by the nut and the latter rotating on top of the block.

The upper end of the screw 14 has a fixed transverse head 20, the same fitting between flanges 21 formed with a channel 22, the head 20 being pivotally engaged between the flanges 21 by a rivet 23 having extended rounded heads as shown.

A screw 24 passes upwardly through the plate element of the channel at the center of its length and also through one of the several openings 25 in a channel shaped beam 26, the screw being fixed in the element 22 and provided with a knurled nut 27 by which the beam can be clamped to the channel partially enclosed in it.

The beam 26 is provided with saddle-like seats 28 fixed rigidly at its ends to accomodate the riders, handles 29 being arranged transversely in front of the seats, said handles being supported by posts 30 fixed in the beam 26.

Extending between the posts 30 is a rigid rod 31 on which is slidably mounted a cylindrical counter poise or weight 32, said weight having a lateral opening in which is provided a contact plug 33 pressed by a spring 34 abutting a blind head screw 35 level with the surface of the weight.

From the foregoing it will be seen that the beam 26 can be adjusted on the supporting channel bracket 22 lengthwise so as to cause the riders to be in partial equilibrium and then make further adjustments by means of the slidable counter-weight 32, which, due to the friction device therein, will remain in adjusted position.

Not only are ample provisions made for the comfort of the riders, but the handles 29, if properly grasped, act as sufficient safety devices, and, as has been seen, the beam is rotatable about its support and also adjustable as to height relative to the surface on which the standard is placed.

From the foregoing it will be seen that a simple device for the purpose has been disclosed in the preferred embodiment of the invention, but it is obvious that minor changes may be made not involving invention and without conflicting with the scope of the appended claims.

Having thus described my invention and set forth the parts which are thought to be new, what I claim and desire to secure by Letters Patent, is:—

1. A see-saw comprising a stand, a screw rotatable in the upper portion thereof, means for preventing said screw from rotation, a nut on said screw resting on said stand, a beam pivotally carried by said screw, and means for adjusting said beam lengthwise, transversely of said screw.

2. A see saw having the combination with a supporting stand, and a beam fulcrumed thereon, of means to counter-balance differences of weights carried by the ends of said beam including a weighted carriage, a track for said carriage, and a spring automatically exerting pressure of said carriage against said track to maintain the carriage at any adjusted position along the track.

3. A see saw having the combination with a supporting stand, and a beam fulcrumed thereon, of means to adjust the fulcrum at any point away from the centre of the beam including a pivoted fitting, said fitting having a threaded member projecting upwardly therefrom, said beam having a series of holes either of which is adapted to slip over said member, and a nut threading over said member.

4. A see saw having the combination with a supporting stand, and a beam fulcrumed thereon, of means to vary the counterbalancing value of the beam including a fitting pivoted to swing in a vertical plane, said fitting and beam having means to guide the latter, longitudinally on said former, and means at one side of the centre of said beam to secure the beam to said fitting at a plurality of points.

In witness whereof I have affixed my signature.

DAVID NAGY.